(12) United States Patent
Kropp et al.

(10) Patent No.: US 11,598,378 B2
(45) Date of Patent: Mar. 7, 2023

(54) COUPLING WITH IMPROVED BUSH-RING CONNECTION

(71) Applicant: FLENDER GMBH, Bocholt (DE)

(72) Inventors: Michael Kropp, Stadtlohn (DE); Niklas Sondermann, Hamminkeln (DE)

(73) Assignee: FLENDER GMBH, Bocholt (DE)

( * ) Notice: Subject to any disclaimer, the term of this patent is extended or adjusted under 35 U.S.C. 154(b) by 370 days.

(21) Appl. No.: 16/824,412

(22) Filed: Mar. 19, 2020

(65) Prior Publication Data
US 2020/0300393 A1    Sep. 24, 2020

(30) Foreign Application Priority Data

Mar. 20, 2019 (EP) .................................. 19163960

(51) Int. Cl.
*F16D 3/78* (2006.01)
*F16D 3/79* (2006.01)

(52) U.S. Cl.
CPC .................. *F16D 3/78* (2013.01); *F16D 3/79* (2013.01); *Y10T 29/49895* (2015.01); *Y10T 403/7176* (2015.01)

(58) Field of Classification Search
CPC ........ F16D 3/78; F16D 3/79; Y10T 29/49895; Y10T 403/7176

USPC .............................................. 464/94, 95, 99
See application file for complete search history.

(56) References Cited

U.S. PATENT DOCUMENTS

| | | | |
|---|---|---|---|
| 4,055,966 A | 11/1977 | Fredericks | |
| 4,846,761 A * | 7/1989 | Weiss | F16D 3/60 |
| 6,315,670 B1 | 11/2001 | Andra et al. | |
| 6,452,287 B1 * | 9/2002 | Looker | F03D 9/28 |
| | | | 290/55 |
| 6,626,763 B2 * | 9/2003 | Aoki | F16D 3/78 |
| | | | 464/94 |
| 7,871,331 B2 | 1/2011 | Wahling et al. | |
| 10,948,023 B2 * | 3/2021 | Kleinewegen | F16D 3/78 |
| 2010/0099505 A1 | 4/2010 | Corey | |

FOREIGN PATENT DOCUMENTS

| | | |
|---|---|---|
| CN | 101395395 | 3/2009 |
| DE | 3621188 A1 | 1/1988 |
| DE | 4227476 C1 | 9/1993 |
| DE | 19742361 A1 | 4/1999 |
| DE | 20201110002 U1 | 9/2012 |

\* cited by examiner

*Primary Examiner* — Greg Binda
(74) *Attorney, Agent, or Firm* — Harry M. Feiereisen LLC

(57) ABSTRACT

A coupling includes a plurality of laminations forming a lamination package and having lamination holes arranged flush to form an assembly opening, a ring, and a bush accommodated in the assembly opening and having a first end area connected to the ring via a form-fit connection.

15 Claims, 9 Drawing Sheets

COUPLING WITH IMPROVED BUSH-RING CONNECTION

CROSS-REFERENCES TO RELATED APPLICATIONS

This application claims the priority of European Patent Application, Serial No. 19163960.8, filed Mar. 20, 2019, pursuant to 35 U.S.C. 119(a)-(d), the disclosure of which is incorporated herein by reference in its entirety as if fully set forth herein.

BACKGROUND OF THE INVENTION

The present invention relates to a coupling, to a method of manufacturing a corresponding coupling, to a shaft arrangement having a corresponding coupling, and to an industrial application that is equipped with such a shaft arrangement.

The following discussion of related art is provided to assist the reader in understanding the advantages of the invention, and is not to be construed as an admission that this related art is prior art to this invention.

In many industrial applications there is a need for powerful couplings that are compact and reliable, can be manufactured economically, and are easy to maintain.

It would be desirable and advantageous to provide an improved coupling to obviate prior art shortcomings.

SUMMARY OF THE INVENTION

According to one aspect of the present invention, a coupling includes a plurality of laminations forming a lamination package and having lamination holes arranged flush to form an assembly opening, a ring, and a bush accommodated in the assembly opening and having a first end area connected to the ring via a form-fit connection.

In accordance with the present invention, a coupling includes a plurality of laminations, which are embodied, during operation of the coupling, to transmit tensile forces and in this way to transmit torque from a first coupling side to a second coupling side. The laminations are bundled, i.e. grouped into packages of laminations. Embodied in the laminations are lamination holes and the laminations are arranged in the lamination package so that the lamination holes align with one another. Through this, at least one assembly opening is formed in the lamination package, via which the lamination package is able to be connected to the first or second coupling side. The connection between the lamination package and a coupling side is guaranteed by a bolt for example. A bush is accommodated in the at least one assembly opening, through which a bolt extends in the assembled state. The bush accordingly has at least one hollow-cylindrical section. In a first end area, i.e. at at least one end of the hollow-cylindrical section, the bush is able to be connected to a ring in a form fit. In the end area, the bush has a shape that is able to be deformed by an assembly force in a restorable manner, i.e. essentially elastically, and in this way a form fit with the ring is created. The form fit brought about in this way prevents a separation of the ring from the bush in an axial direction. The ring is embodied in such a way that, in the assembled state the ring supplements the shape of the bush in the respective first end area essentially to form the shape of a collared bush.

A form-fit connection between the bush and the ring allows its assembly and where necessary also its disassembly to be carried out in a simple manner with low assembly forces. Accordingly simpler tools can be used or a number of rings can be connected to bushes at the same time with relatively little effort. Consequently, a coupling according to the present invention can be manufactured quickly and cost-effectively. The reduced assembly forces mean that the coupling can be disassembled equally easily, which increases the maintenance friendliness in a plurality of industrial applications.

According to another advantageous feature of the present invention, at least one of the bush and the ring can be made of deformable material to render the form-fit connection releasable. Thus, in an assembly or disassembly process, the bush can be deformed in such a way that the ring can be pushed over the bush. Accordingly the ring can also be deformed when being pushed onto the bush. A combination of the two is likewise also possible. A deformation in this case is to be understood as an essentially elastic deformation, in which proportions of plastic deformation are negligible in a one-off assembly. This enables a restoration force to be produced in the ring and/or the bush.

According to another advantageous feature of the present invention, the bush and the ring can be connected to one another in an assembled state by a non-positive connection and/or a form-fit connection. A non-positive connection can exist for example between an inner surface of the ring and an outer surface in the end area of the bush. A form fit in turn can be made for example by a clip-on connection between the ring and the bush. A form fit has a reduced tendency to relaxation and in this way offers a high degree of retention force over the long term. A clip-on connection can be established for example by a latching lug on the outer surface of the bush in the corresponding end area or on the inner surface of the ring. A latching groove can be embodied corresponding to the latching lug on the bush or the ring. These types of clip-on connections are able to be designed in a simple manner so that a desired assembly force is able to be set. In this case the other mechanical demands made on the bush or the ring can remain unaffected. Accordingly the claimed solution is able to be adapted in a simple manner for a plurality of application cases. Furthermore a clip-on connection latches-in automatically during assembly, which further simplifies the assembly process. Moreover size-specific tools, such as for example pressure cones for cold forming, are unnecessary during the assembly of the lamination package of the claimed coupling.

According to another advantageous feature of the present invention, the bush and/or the ring can be made of metallic material or plastic. Examples of a metallic material include steel, a steel alloy, copper, a copper alloy, aluminum, or an aluminum alloy, Metallic materials offer a high degree of strength and are able to be worked in a tried and tested way. A metallic material is in particular able to be worked so that the bush and/or the ring in the area of the form-fit connection, for example on the inner surface of the ring or an end area of the bush, are soft enough for a reduced assembly force to be achieved. At the same time the bush and/or the ring are able to be designed in such a way that they still offer a high degree of stability. As a result, the reduced assembly force is not achieved at the expense of ability to withstand mechanical stress or of the reliability of the coupling. As a further alternative the ring and/or the bush can be made of plastic. Plastics offer a low density and are cost-effective. Plastics are also electrically insulating and in this way allow components connected to one another via the coupling to be protected, and in this way the principle of functional integration to be realized.

According to another advantageous feature of the present invention, the bush can have a collar on one side for support of the bush against the lamination package. The bush can thus be embodied as a collared bush. Such a collar allows the bush to be supported on one side against the lamination package and, by fitting the ring in the end area that faces away from the collar, allows the assembly to be completed. The number of components required is minimized through the use of a bush with a collar and a ring. As a result, the number of assembly steps is also reduced.

According to another advantageous feature of the present invention, the bush can have a first end area and a second end area, i.e. on both skies, with a ring being connected also to the second end area of the bush via a form-fit connection. For assembly, a bush is accordingly connected to two rings in a form fit. The form-fit connections between the bush and the rings in this case can be made in the same way in the first and second end area. For this purpose, end rings, which are fitted to the bush in the first and second end area, can be embodied identically, i.e. able to be interchanged with one another. The number of different parts is also reduced by this. A bush without a collar further represents a relatively simple part that is able to be manufactured quickly and cost-effectively. As a result, a coupling according to the present invention can be implemented in an especially economic way.

According to another advantageous feature of the present invention, an intermediate ring can be arranged in the assembled state between the bush and the ring to establish the non-positive connection and/or the form fit. The intermediate ring serves to establish the non-positive connection and/or the form fit between the bush and the ring. The intermediate ring can be made of an elastomer for example and be arranged during assembly on the corresponding end area of the bush or on the inner surface of the ring. In particular the intermediate ring can be positioned in a latching groove, which is embodied in the end area of the bush or on the inner surface of the ring. In addition, the intermediate ring can serve as a seal. The intermediate ring is explicitly designed to be employed as a wear part, so that in a reassembly of the coupling damage to or degradation of the bush and/or of the ring is able to be excluded. The intermediate ring can be made from a metallic material or from a plastic, for example an elastomer. Intermediate rings made from a metallic material are able to be manufactured with high precision and last a long time. Plastics on the other hand are cost-effective and therefore especially suitable as wear parts.

According to another advantageous feature of the present invention, the ring can be connected to the bush via the form-fit connection by applying an assembly force of up to 15 kN, preferably of up to 10 kN, further preferably of up to 8 kN, especially preferably of up to 6.5 kN. Such assembly forces can already be exerted for example by simple hydraulic tools or electrically actuated machines. The claimed solution, as outlined above, can be designed constructively in a simple way as regards the assembly force. Accordingly only low demands are made on the manufacturing of the claimed coupling.

Moreover the bush can be provided with an alignment groove and/or an alignment spring. The latching lug or latching groove in the end area of the bush, viewed in the circumferential direction, is interrupted by the alignment groove or alignment spring. As an alternative or in addition, the ring can be provided with an alignment groove and/or alignment spring. In particular at least one alignment groove and at least one alignment spring of the ring or of the bush can be embodied corresponding to one another. An exact angular position of the ring in relation to the bush is guaranteed by this in the assembled state. The alignment groove and/or alignment spring can further be arranged between a latching groove and a latching lug in the end area of the bush. As a result, the alignment groove or the alignment spring interrupts an alternating sequence of at least one latching groove and one latching spring in the circumferential direction. Corresponding to this, the ring can also be equipped on its inner surface with at least one latching groove and a latching spring, between which an alignment groove or alignment spring are positioned.

According to another aspect of the present invention, a method for manufacturing a coupling includes forming a lamination package with a plurality of assembly openings, inserting bushes into at least a number of assembly openings of the lamination package, and connecting each of the bushes to a ring by pressing the ring onto the bush to thereby establish a form-fit connection between the bush and the ring.

In accordance with the present invention, the rings are pushed onto the bushes and a form-fit connection is established between the bushes and the respective rings. A method according to the present invention enables packages of laminations to be manufactured for couplings in accordance with the description as outlined above.

According to another advantageous feature of the present invention, the rings and the bushes can be connected essentially at a same time. For example a number of rings can be pressed onto the bushes with a stamp. Likewise the bushes can also be pressed onto the rings by a stamp. The manufacture of the coupling is speeded up and simplified by essentially connecting bushes and rings at the same time. In particular the economy in manufacturing couplings with a large number of assembly openings is increased by this. Moreover in a method according to the present invention, use of a size-specific tool, such as for example a pressure cone for cold forming, is unnecessary. As a result, a coupling can be manufactured rapidly with a reduced outlay in tools. Packages of laminations of different sizes can further be produced rapidly one after another without the effort of retooling. A method according to the present invention is therefore flexible to thereby offer increased productivity in the manufacturing of couplings.

According to another advantageous feature of the present invention, at least one of the form-fit connections between the bushes and the rings can be configured releasable. A releasable connection between the bush and the ring is to be understood as a connection after the release of which the bush and/or the ring is able to be re-used. This can be a clip-on connection for example. A releasable connection enables couplings to be manufactured in accordance with the claimed method to be inspected and repaired especially easily.

According to yet another aspect of the present invention, a shaft arrangement includes a first shaft, a second shaft, and a coupling connecting the first shaft to the second shaft for transmission of torque, with the coupling including a plurality of laminations forming a lamination package and having lamination holes arranged flush to form an assembly opening, a ring, and a bush accommodated in the assembly opening and having a first end area connected to the ring via a form-fit connection.

A transmission of torque from the first shaft to the second shaft or vice versa is guaranteed by the coupling. The coupling, which connects the first and second shafts, is configured as outlined above. Through the use of such a coupling, a shaft arrangement according to the present invention can be manufactured in a cost-effective way and can be easily inspected and repaired.

According to yet another aspect of the present invention, an industrial application includes a drive unit including a shaft for transmission of a drive power supplied by the drive unit, a mechanical application including a shaft to supply at least partly the drive power of the mechanical application necessary for the operation, and a coupling connecting the shaft of the drive unit and the shaft of the mechanical application to one another for transmission of torque. As a result, drive power provided by the drive unit is supplied to the mechanical application. The drive unit can be configured as an electric motor, a combustion engine or a hydraulic motor for example. The mechanical application can be embodied for example as a mill, a vertical mill, a sugar mill, a cement mill, a rock crusher, a conveyor belt, a pump, a roller press, a plate belt, a tube mill, a rotary kiln, a rotary mechanism, a stirring mechanism, a lifting device, a mill press or a scrap press. The first and second shafts and the coupling belong to a shaft arrangement, which is embodied in accordance with the invention as outlined above. In particular the ease of repairing the coupling makes it possible to minimize downtimes of the industrial application and to increase its economy in this way.

According to yet another aspect of the present invention, a wind power plant includes a generator, a drive train including a rotor shaft in driving relationship to the generator and a coupling connecting the rotor shaft to a shaft of the generator for transmission of torque, with the coupling including a plurality of laminations forming a lamination package and having lamination holes arranged flush to form an assembly opening, a ring, and a bush accommodated in the assembly opening and having a first end area connected to the ring via a form-fit connection, and a rotor connected to the rotor shaft. The rotor shaft can be accommodated in a gondola and belongs to the drive train that also includes a generator. Gearing, in particular a multi-stage planetary gear, can additionally be connected mechanically between the generator and the rotor shaft, which then also belongs to the drive train. In accordance with the invention, a coupling is arranged between the rotor shaft and the generator, which connects components of the drive train for torque transmission. The coupling in this case can be fitted for example directly between the generator and the rotor shaft, between the rotor shaft and the gearing, or between the gearing and the generator. The coupling according to the present invention is cost effective and has an enhanced maintenance and repair friendliness.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
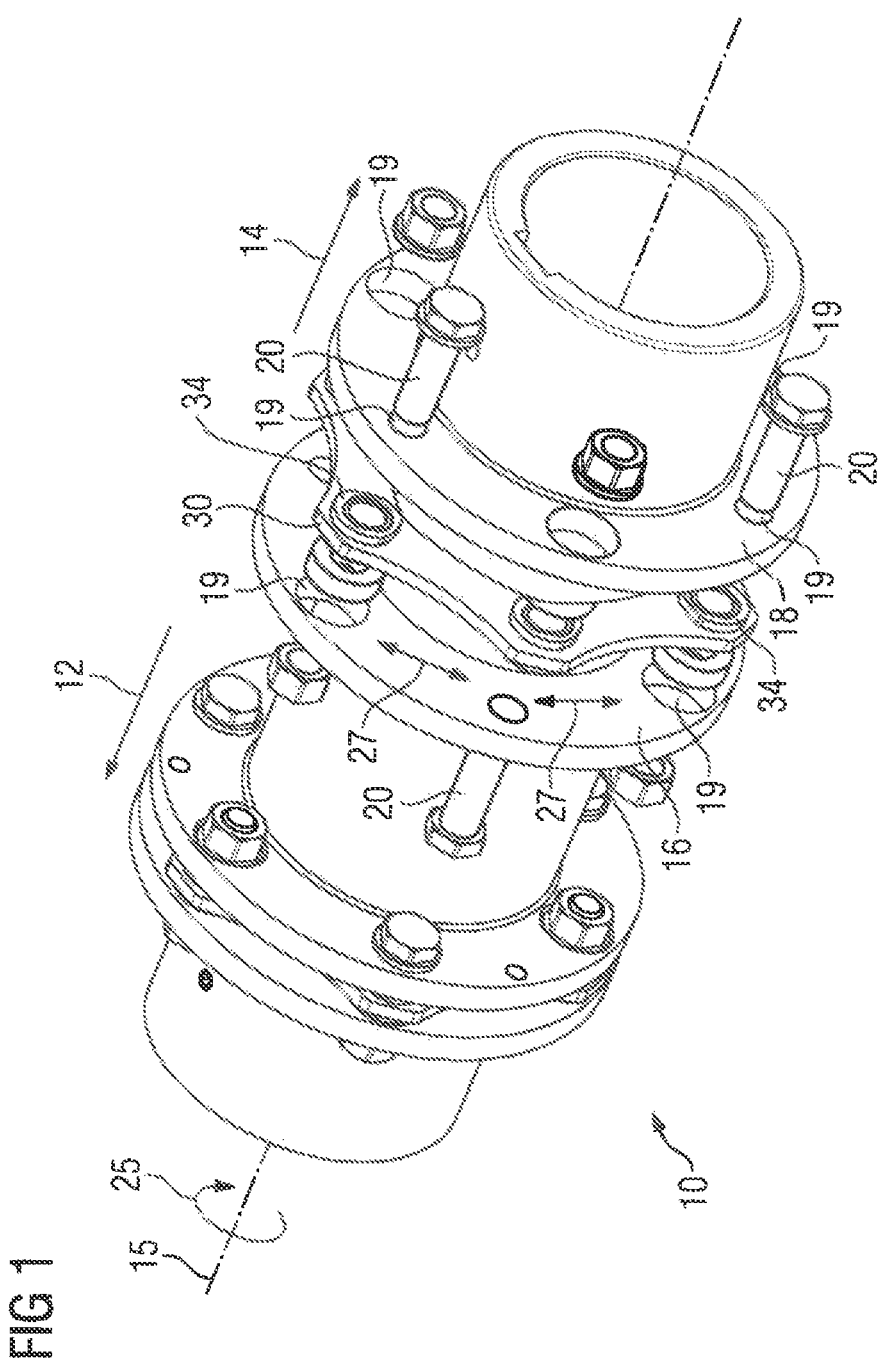
FIG. 1 shows a schematic oblique view of a first embodiment of a coupling according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 2:
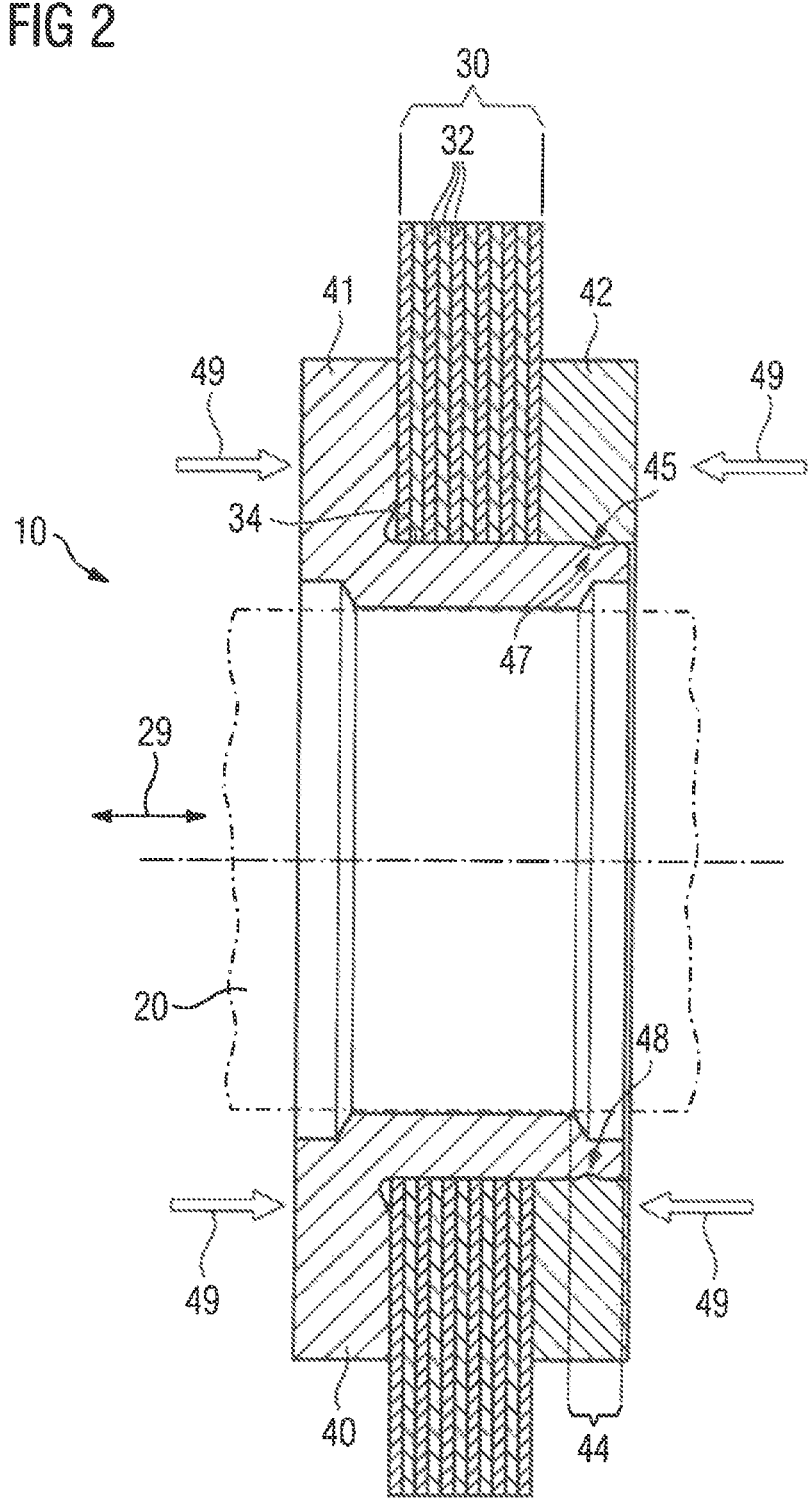
FIG. 2 shows a schematic detailed sectional view of the coupling of FIG. 1.

Turning now to the drawing, and in particular to FIG. 1, there is shown a schematic oblique view of a first embodiment of a coupling according to the present invention, generally designated by reference numeral 10. The coupling 10 includes a first coupling side, indicated by arrow 12, which correspondingly has a first coupling flange 16 and a second coupling flange 18. The first and second coupling flanges 16, 18 are connected to one another for torque transmission via a lamination package 30. During rotation about a main axis of rotation 15 of the coupling 10, a drive power, indicated by arrow 25, is transmitted from the first coupling side 12 to the second coupling side 14. The lamination package 30 includes a plurality of laminations 32, which are essentially arranged in layers on one another, as shown in FIG. 2, and which are embodied to accommodate tensile stress, indicated by double arrows 27, for transmission of the drive power 25. To introduce the drive power 25 into the lamination package 30, the lamination package 30 is connected via bolts 20, which are accommodated in flange holes 19, The bolts 20, viewed in a circumferential direction, are connected alternately to the first coupling flange 16 and the second coupling flange 18. Each of the laminations 32 has a plurality of lamination holes 34. The laminations 32 are arranged in the lamination package 30 such that the lamination holes 32 align with one another to thereby form assembly openings. Accommodated in each of the assembly openings is a bush 40, to which a ring 42 is fastened.

Figure 3:
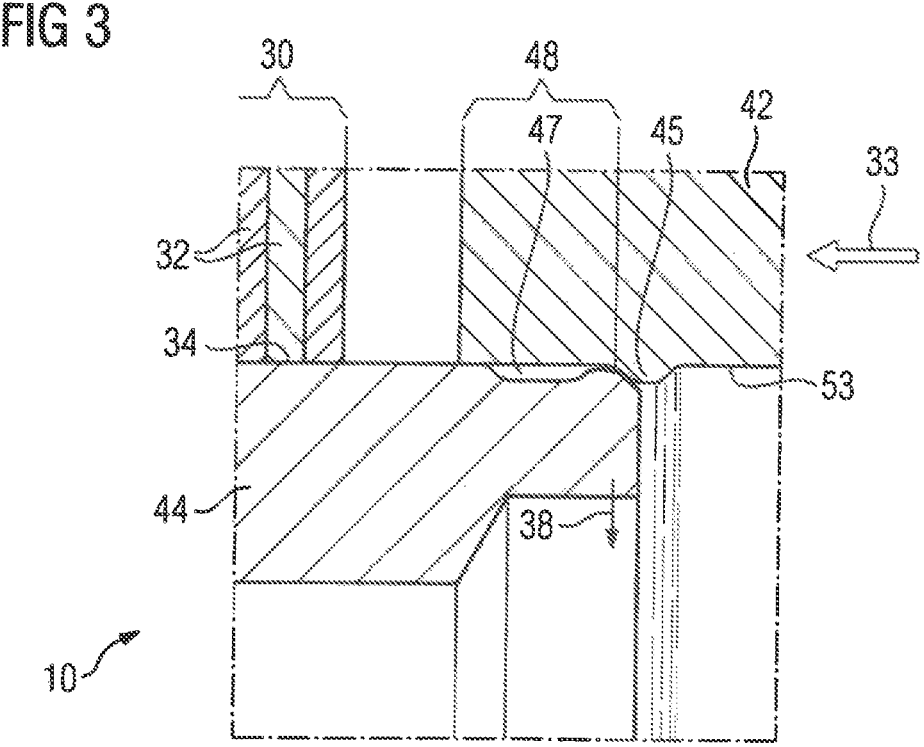
FIG. 3 shows a detailed view of an intermediate step of manufacturing the coupling by a manufacturing method according to the present invention.

FIG. 2 shows schematically a cross-sectional view of the lamination package 30 of the coupling 10. In detail, FIG. 2 shows lamination package 30, which includes the plurality of laminations 32, the lamination holes 34 of which are aligned to produce the assembly opening. The assembly opening is embodied to accept a bolt 20 not shown in any greater detail, Arranged in the assembly opening for this purpose is a bush 40, which extends through the assembly opening. The bush 40 is provided on one side of the lamination package 30 with a collar 41, which allows the bush 40 to be supported against the lamination package 30. The collar 41 is formed on and embodied in one piece with a first end area 44 of the bush 40, which is essentially located on a side of the lamination package 30 facing away from the collar 41. A ring 42 is arranged in the first end area 44 and is connected releasably to the bush 40. For this purpose, as shown in FIG. 3, the ring 42 has an inner surface 53 formed with a latching lug 45 for engagement in a latching groove 47 in the first end area 44 of the bush 40. The latching lug 45 and the latching groove 47 are at least in part embodied circumferentially and through their shape create a form fit 48 and thereby realize a clip-on connection. As a result of the form fit 48 in an axial direction, indicated by double arrow 29 and oriented essentially in parallel to the main axis of rotation 15, an undesired disassembly of the connected individual parts, i.e. the bush 40, the laminations 32 and the ring 42 is prevented. A holding force, indicated by arrows 49, is exerted for this.

FIG. 3 shows a schematic illustration of the lamination package 30 of the coupling 10 during an intermediate step 130 (FIG. 9) of a manufacturing method, after the laminations 32 have been arranged to form the lamination package 30 and a bush 40 is inserted into the assembly openings of the lamination package 30. According to FIG. 3, a ring 42 is pushed by an assembly force in a direction indicated by arrow 33 onto the first end area 44 of the bush 40. As a result of the assembly force 33, the bush 40 undergoes an elastic deformation, indicated by arrow 38, in the first end area 44 by the latching lug 45 on an inner surface of the ring 42, so that the latching lug 45 latches into the latching groove 47. The latching lug 45 and the latching groove 47 jointly create a form fit 48, through which the ring 42 is fastened reliably and stably onto the bush 40. In the assembled state of the ring 42 and the bush 40, the bush 40 is suitable for accommodating a bolt 20 for final assembly of a coupling 10 as shown in FIG. 1. As a result, a releasable connection is established between the ring 42 and the bush 40 in particular a clip-on connection.

Figure 4:
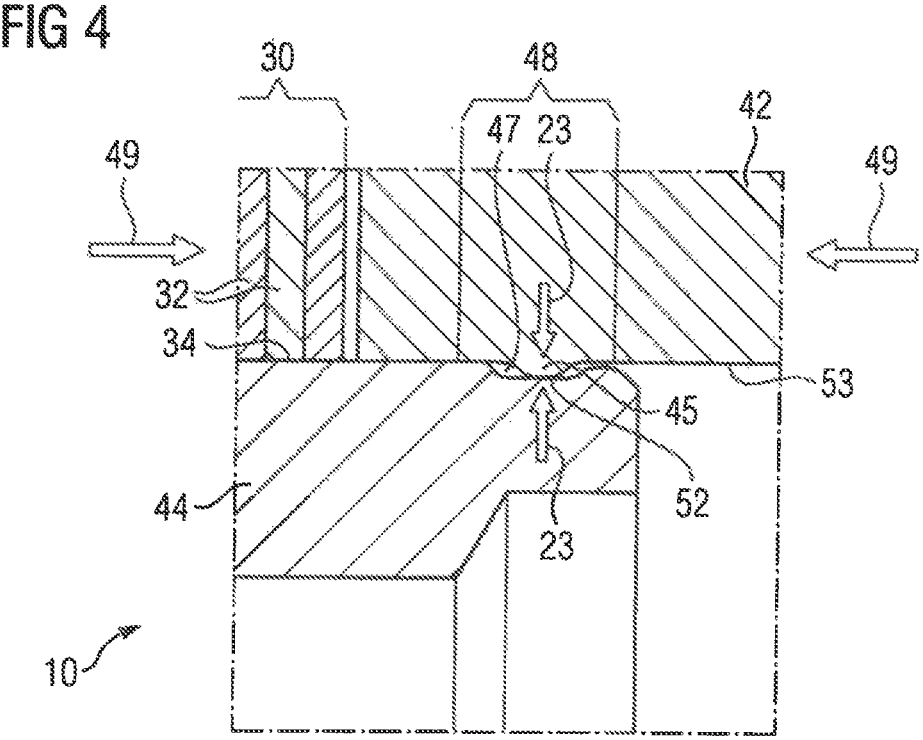
FIG. 4 shows a detailed view of a subsequent step of the manufacturing method.

FIG. 4 shows a detailed view of a subsequent step 200 (FIG. 9) of the manufacturing method, depicting the ring 42, after latching of the latching lug 45 into the latching groove 47 in a contact area 52, in contact with the first end area 44 of the bush 40. A pressure exists between the latching lug 45 and the latching groove 47, through which in addition to the form fit 48, a non-positive connection is produced. The contact area 52, and thus also the non-positive connection between the ring 42 and the bush 40 is at least partly embodied circumferentially. The ring 42 and the bush 40 are made of a metallic material, so that an appropriately high restoration force, indicated by arrows 23, is produced in them to create the corresponding non-positive connection that is able to be stressed. The interaction of the form fit 48 and the non-positive connection offers a high degree of rigidity for the releasable connection of the ring 42 and the bush 40. The form fit 48 prevents the ring 42 falling down from the bush 40. The effect of the non-positive connection is that an axial play, which might possibly be present of the form-fit connection, does not lead directly to a vibration, i.e. a clattering of the ring 42 on the bush 40. Overall a holding force, indicated by arrows 49, is exerted.

Figure 5:
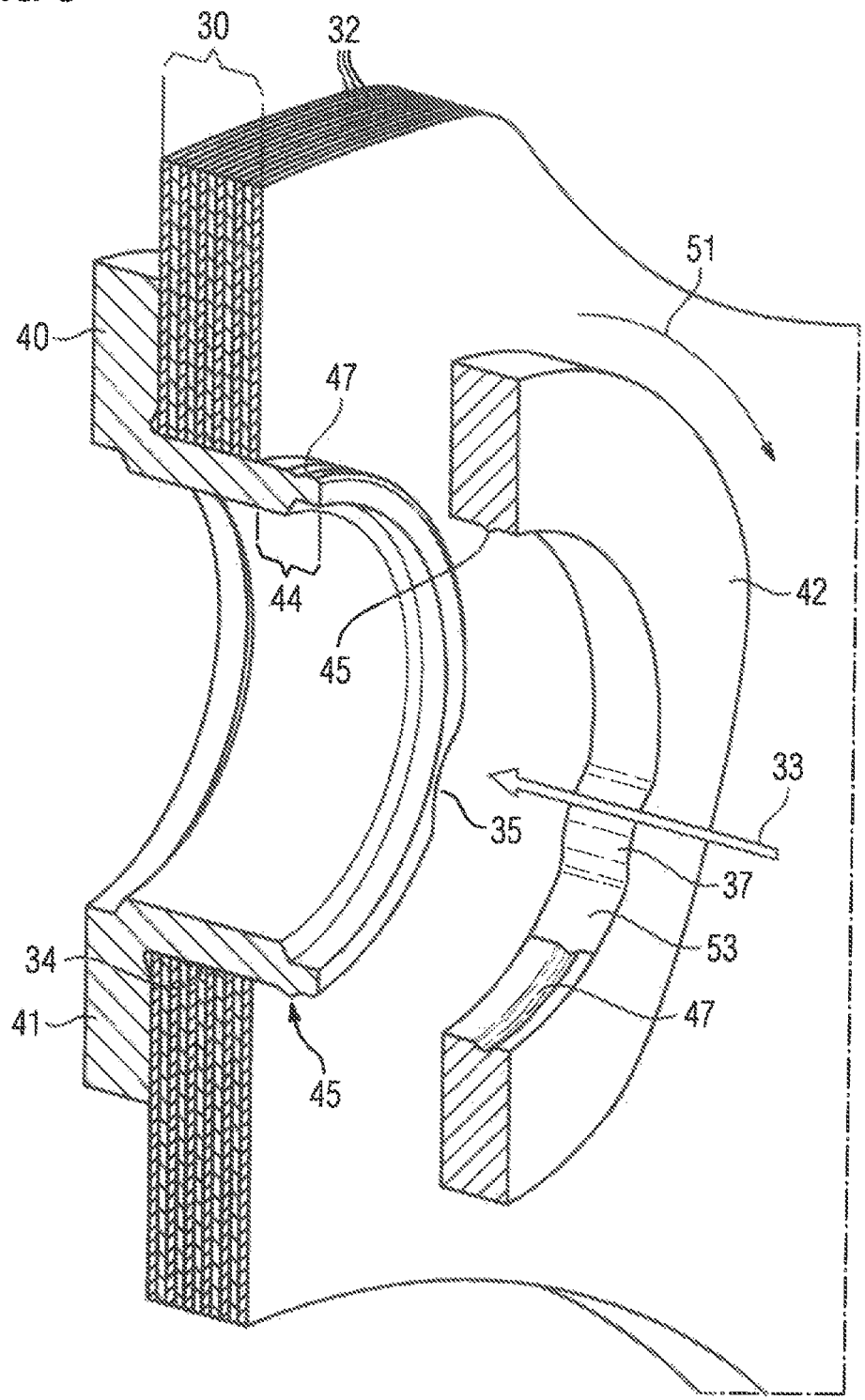
FIG. 5 shows a schematic oblique view of a second embodiment of a coupling according to the present invention during a first step of manufacturing the coupling.

FIG. 5 shows a cross-sectional oblique view of a second embodiment of a coupling 10 during step 130 of the manufacturing method, after providing the lamination package 30 comprised of a number of laminations 32 and after a bush 40 with a collar 41 is inserted into the assembly openings of the lamination package 30, with the assembly openings being formed by a number of lamination holes 34, which are arranged flush with one another, Parts corresponding with those in FIGS. 1-4 are denoted by identical reference numerals and not explained again. During step 130, a ring 42 is pushed by an assembly force in a direction of arrow 33 onto a first end area 44 of the bush 40. Latching groove 47 and latching lug 45 are formed in the first end area 44 of the bush 40. The latching groove 47 and the latching lug 45 in the first end area 44 are spaced apart on the bush 40 in a circumferential direction, indicated by arrow 51, by an alignment groove 35. Corresponding thereto, an inner surface 53 of the ring 42 is embodied with a latching groove 47 and a latching lug 45. The latching groove 47 and the latching lug 45 are spaced apart on the rings 42 by an alignment spring 37. The alignment groove 35 of the bush 40 is embodied to accept the alignment spring 37 of the ring 42. Through this, an exact angular positioning of the ring 42 from the lamination package 30 is guaranteed. As an alternative, the alignment spring 37 can also be embodied on the bush 40 and the alignment groove 35 on the rings 42. In the assembled state, a form fit 48 is established by the latching lug 45 on the bush 40 and the latching groove 47 on the ring 42. Thus a releasable connection, in particular a clip-on connection, is established between the ring 42 and the bush 40. A plurality of rings 42 is further able to be mounted on a corresponding plurality of bushes 40 on one lamination package 30 at the same time, as shown in FIG. 5. To do this, the assembly force 33 is exerted in each case for example by a stamp not shown in the figure.

Figure 6:
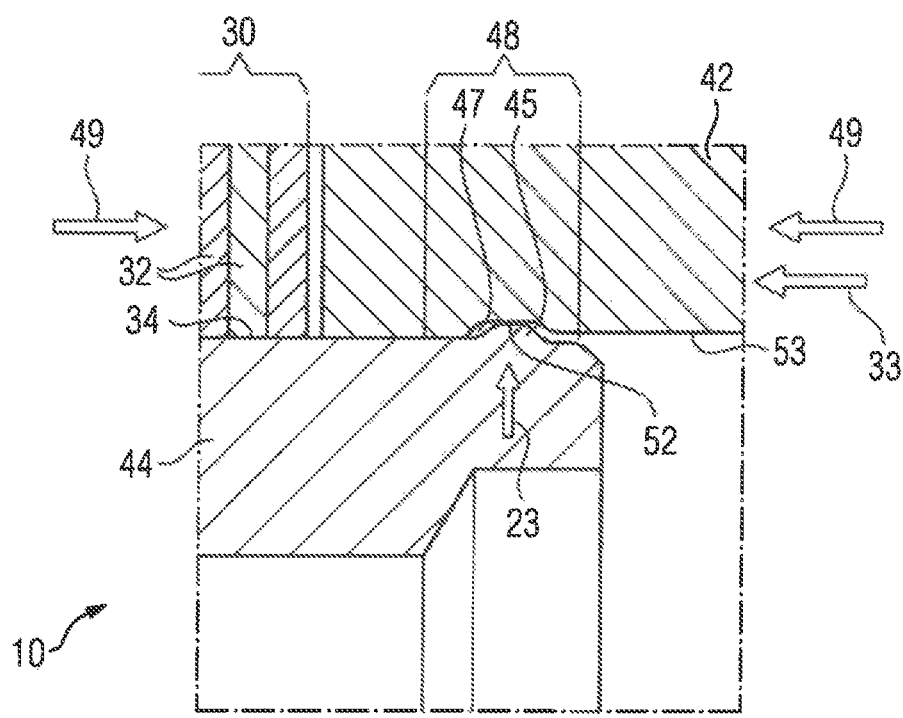
FIG. 6 shows a schematic detailed view of a third embodiment of a coupling according to the present invention.

FIG. 6 shows a schematic detailed view of a third embodiment of a coupling 10, depicting a lamination package 30 in an assembled state and having a bush 40 with a first end area 44, onto which a ring 42 is pushed. Parts corresponding with those in FIGS. 1-5 are denoted by identical reference numerals and not explained again. The bush 40 is arranged in an assembly opening formed by lamination holes 34 arranged flush with one another. The ring 42 rests against the lamination package 30, which is comprised of a plurality of laminations 32. Latching lug 45 is embodied in the first end area 44 of the bush 40 and engages in a latching groove 47 on the ring 42. A form fit 48 is produced by the latching lug 45 and the latching groove 47, through which the ring 42 and the bush 40 are held in position relative to one another. A non-positive connection is additionally created by the latching lug 45, which rests under pressure in the latching groove 47 against an inner surface 53 of the ring 42 in a contact area. As a result, the ring 42 and the bush 40 overall form a releasable connection, in particular a clip-on connection, Upon assembly of the ring 42, Le, when it is pressed on with an assembly force, indicated by arrow 33, in step 130, a press force, indicated by arrow 49, is exerted on the lamination package 30.

Figure 7:
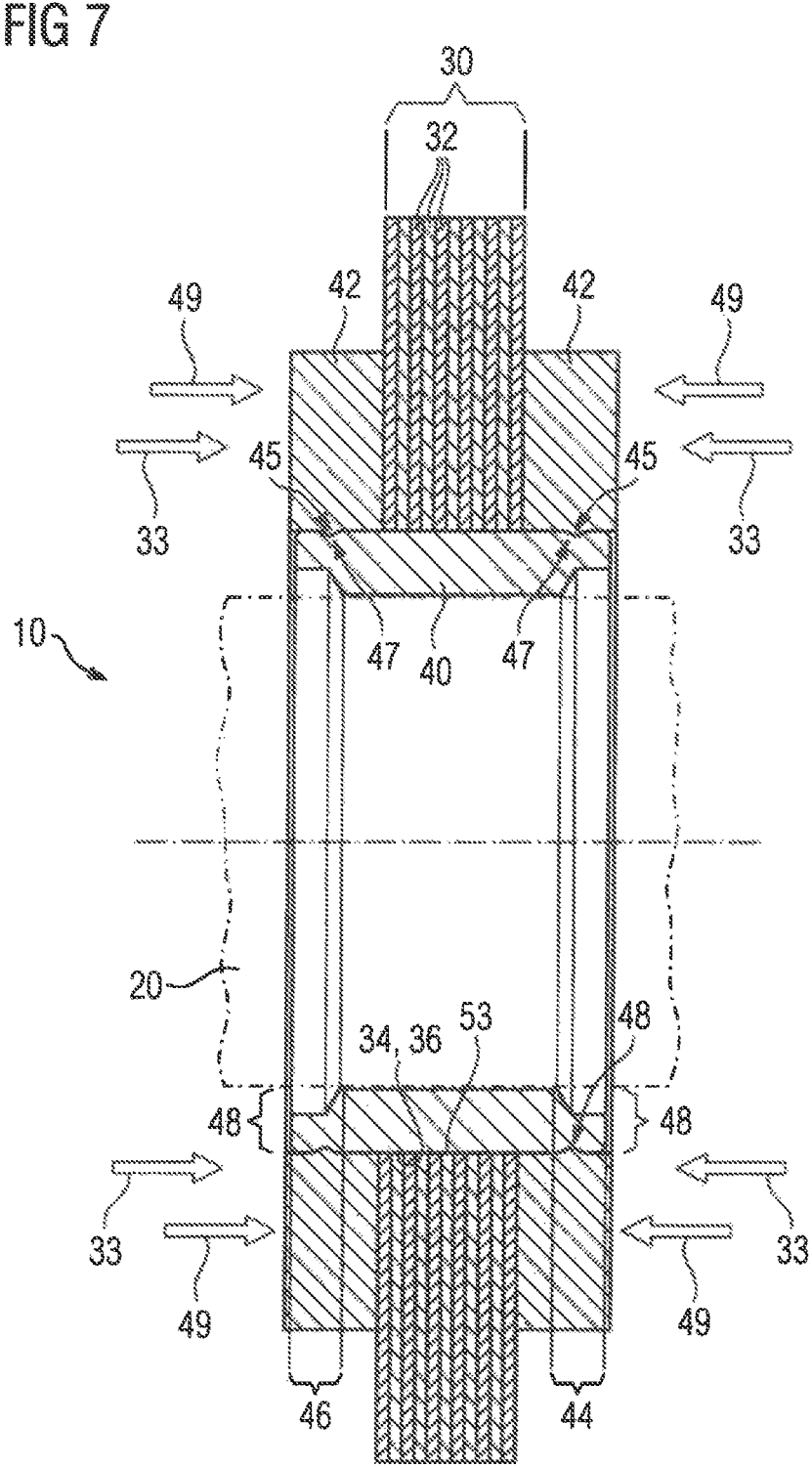
FIG. 7 shows a schematic sectional view of a fourth embodiment of a coupling according to the present invention.

FIG. 7 shows a schematic cross-sectional view of a fourth embodiment of a coupling 10, depicting a lamination package 30 formed from a plurality of laminations 32. Parts corresponding with those in FIGS. 1-6 are denoted by identical reference numerals and not explained again. Lamination holes 34, which are arranged flush with one another, are embodied in the laminations 32. In this way the lamination holes 34 together form an assembly opening, which is embodied to accept a bolt 20 not shown in any greater detail. A bush 40 is embodied in the assembly opening, which has a first end area 44 and a second end area 46. A ring 42 is fitted to each of the two end areas 44, 46, through which the bush 40 is held on the lamination package 30. A latching groove 47, which is embodied circumferentially, is embodied in each of the end areas 44, 46 of the bush 40 facing away from each other. The rings 42 each have a latching lug 45 on their inner surfaces 53, which latching lug 45 is embodied to correspond to the latching groove 47. The latching lug 45 and the latching groove 47, in the assembled state, i.e. after step 130, are latched into one another and make a form fit 48. Overall the rings 42 and the bush 40 each form a dip-on connection in both end areas 44, 46. During step 130, an assembly force, indicated by arrows 33, is exerted, through which the rings 42 and the bush 40 latch into one another and in this way realize the principle of a clip-on connection and in this way provide a releasable connection. A holding force, indicated by arrows 49, is exerted on the lamination package 30 by the assembly force 33. The embodiment in accordance with FIG. 7 is based with the bush 40 and the rings 42 on geometrically simple components, which are able to be manufactured quickly and cost-effectively. The variety of parts for the manufacturing of the coupling 10 is limited in this way, which in its turn leads to a simpler production.

Figure 8:
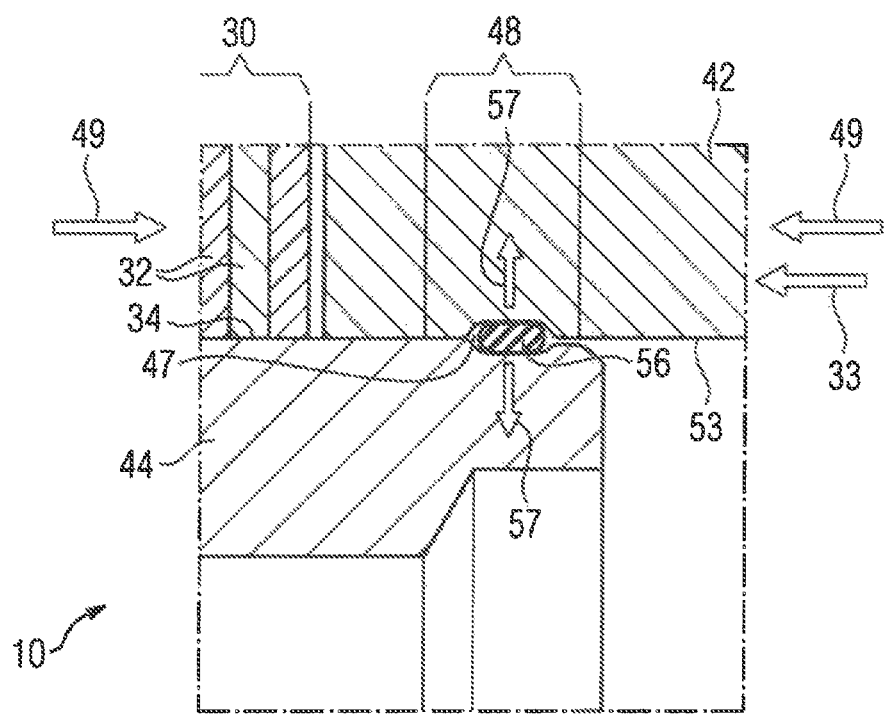
FIG. 8 shows a detailed view of a fifth embodiment of a coupling according to the present invention.

A fifth embodiment of a coupling 10 is shown in a detailed view in FIG. 8, depicting a lamination package 30 comprised of a plurality of laminations 32, in which lamination holes 34 are embodied. Parts corresponding with those in FIGS. 1-7 are denoted by identical reference numerals and not explained again. The lamination holes 34 are arranged flush with one another and in this way form an assembly opening, into which a bush 40 is accepted. A latching groove 47 is embodied in a first end area 44 of the bush 40. A latching groove 47 is also embodied on an inner surface 53 of the ring 42, which is essentially arranged opposite the latching groove 47 in the first end area 48 of the bush 40. An intermediate ring 56, which is made of an elastomer or a metallic material, is arranged in the latching grooves 47. As a result, a restoration force, indicated by arrows 57, is exerted by the intermediate ring 56 on the inner surface 53 of the ring 42 and the first end area 44 of the bush 40. As a result, an indirect form fit 48 between the ring 42 and the bush 40 is established by means of the intermediate ring 56. The connection between the ring 42 and the bush 40 is further able to be released by squeezing the intermediate ring 56. During assembly, i.e. step 130, an assembly force, indicated by arrow 33, is exerted on the ring 42, which allows a sufficient deformation of the intermediate ring 56. In addition, a non-positive connection is established by the restoration force 57 of the intermediate ring 56. As a result of the applied assembly force 33, a holding force 49 is exerted on the lamination package 30.

Figure 9:
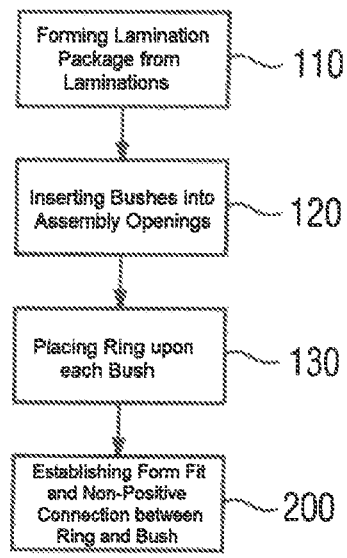
FIG. 9 shows a schematic execution sequence of a manufacturing method according to the present invention.

FIG. 9 shows schematically an execution sequence of a method for manufacturing a coupling 10. In a first step 110, a lamination package 30 is formed from a plurality of laminations 32, with the laminations 32 having lamination holes 34, which are arranged aligned flush to form the assembly openings. A lamination package 30 in this case has a plurality of assembly openings. This is followed by a second step 120, in which bushes 40 are provided and inserted into the assembly openings. The bushes 40 can be inserted in a same orientation or in opposite orientation. This is followed by a third step 130, in which for each bush 40 a ring 42 is provided. The rings 42 are pressed by an assembly force 33 onto the respective bush 40 in a first end area 44 of the bush 40. The bush 40 and the ring 42 are embodied to be connected to one another in a form fit, for example by a clip-on connection. Upon application of the assembly force 33, a press force 49 is exerted on the lamination package 30. In step 200, a form fit 48 is embodied between the ring 42 and the bush 40 in each case. The assembly force 33 for the respective bushes 40 and rings 42 can be created in this case by means of a common stamp. Through this a number of bushes 40 are essentially connected releasably at the same time to a ring 42. As a result, the method in accordance with the invention can be carried out easily and quickly. Couplings 10 in accordance with FIG. 1 to FIG. 8 are in particular able to be manufactured in accordance with the method according to FIG. 9.

Figure 10:
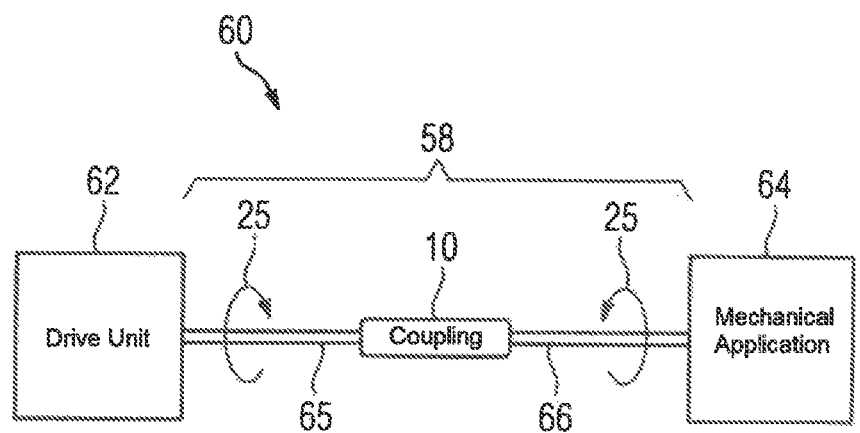
FIG. 10 shows a schematic illustration of an industrial application according to the present invention with a shaft arrangement according to the present invention.

FIG. 10 shows a schematic illustration of an industrial application, generally designated by reference numeral 60. The industrial application includes a drive unit 62 and a mechanical application 64. A drive power 25 is provided by the drive unit 62, which is used for operating the mechanical application 64, which can be embodied for example as a mill, a vertical mill, a sugar mill, a cement mill, a rock crusher, a conveyor belt, a pump, a roller press, a plate belt, a tube mill, a rotary kiln, a rotary mechanism, a stirring mechanism, a lifting device, a mill press or a scrap press. The drive power 25 is directed via a first shaft 65 to a coupling 10, which for its part is connected to a second shaft 66. The coupling 10 together with the first and second shafts 65, 66 forms a shaft arrangement 58. A connection for transmission of torque is established by means of the coupling 10 between the drive unit 62 and the mechanical application 64. The coupling 10 is embodied in this case in accordance with one of the embodiments outlined above and/or can be produced according to one of the manufacturing methods described above.

Figure 11:
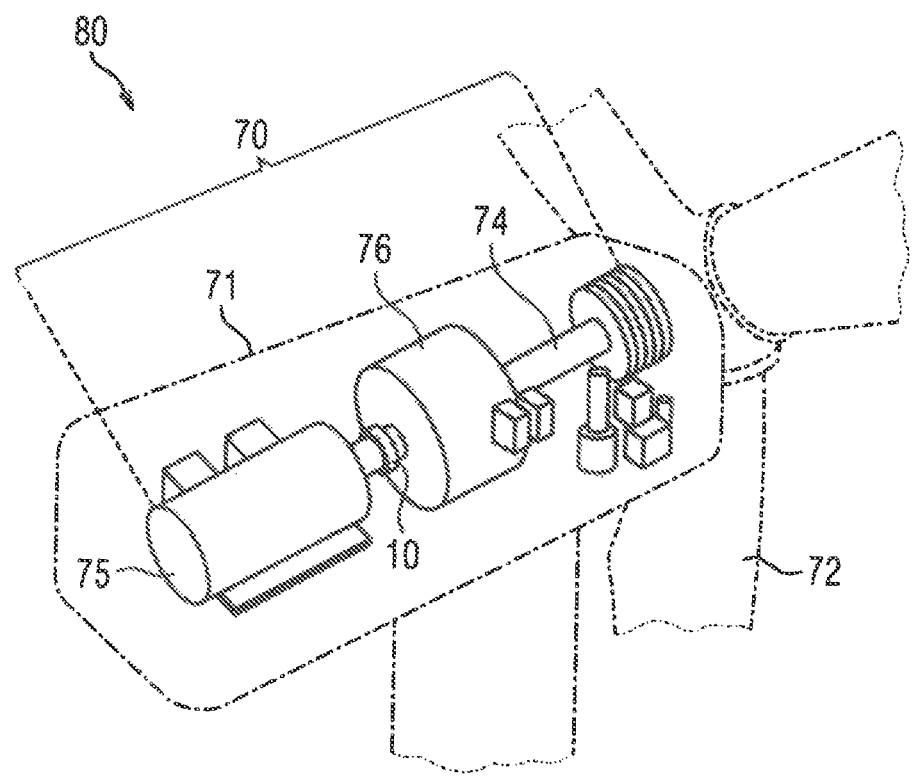
FIG. 11 shows a schematic structure of a wind power plant according to the present invention.

FIG. 11 shows a schematic illustration of a wind power plant, generally designated by reference numeral 80. The wind power plant 80 includes a gondola 71, to which a rotor 72 is attached. The rotor 72 is coupled via a rotor shaft 74 for transmission of torque to gearing 76, which is embodied as a planetary gear. The gearing 76 in turn is connected for torque transmission to a generator 75. A coupling 10 is fitted between the gearing 76 and the generator 75. The coupling 10 in this case is embodied in accordance with one of the embodiments described above.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:
1. A coupling, comprising:
  a plurality of laminations forming a lamination package and having lamination holes arranged so as to be in alignment with an assembly opening;
  a ring;
  a bush made of a metallic material and received in the assembly opening and having a first end region connected to the ring via a releasable form-fit connection in an axial direction, wherein a first latching groove is embodied in a first end area of the bush and a second latching groove is embodied on an inner surface of the ring; and an intermediate ring arranged in an assembled state of the coupling in the first latching groove and the second latching groove opposite the first latching groove, with the intermediate ring establishing a non-positive connection and the releasable form fit connection between the bush and the ring.

2. The coupling of claim 1, wherein the releasable form-fit connection between the bush and the ring is established by a restoring force of the intermediate ring exerted on the inner surface of the ring and the first end region of the bush.

3. The coupling of claim 1, wherein the non-positive connection is established by the restoring force produced by the intermediate ring.

4. The coupling of claim 1, wherein the intermediate ring produces an indirect form fit between the ring and the bush.

5. The coupling of claim 1, wherein the intermediate ring is made of a metallic material or plastic.

6. The coupling of claim 1, wherein the bush has a collar on one side for support of the bush against the lamination package.

7. The coupling of claim 1, wherein the ring is connected to the bush via the form-fit connection by applying an assembly force of up to 15 kN.

8. A shaft arrangement, comprising:
a first shaft;
a second shaft; and
a coupling connecting the first shaft to the second shaft for transmission of torque, said coupling configured as set forth in claim 1.

9. An industrial application, comprising:
a drive unit including a first shaft;
a mechanical application including a second shaft; and
a coupling connecting the first shaft of the drive unit and the second shaft of the mechanical application to one another for transmission of torque, said coupling being configured as set forth in claim 1.

10. A wind power plant, comprising:
a generator;
a drive train including a rotor shaft in driving relationship to the generator and a coupling connecting the rotor shaft to a shaft of the generator for transmission of torque, said coupling being configured a set forth in claim 1; and
a rotor connected to the rotor shaft.

11. The coupling of claim 1, wherein the ring is connected to the bush via the form-fit connection by applying an assembly force of up to 10 k.

12. The coupling of claim 1, wherein the ring is connected to the bush via the form-fit connection by applying an assembly force of up to 8 kN.

13. The coupling of claim 1, wherein the ring is connected to the bush via the form-fit connection by applying an assembly force of up 6.5 kN.

14. A method for manufacturing a coupling, comprising:
forming a lamination package with a plurality of assembly openings;
inserting a bush made of a metallic material into an assembly opening of the lamination package;
placing an intermediate ring in a first latching groove is embodied in a first end area of the bush or a second latching groove embodied on an inner surface of a ring; and
connecting the bush to the ring by pressing the ring onto the bush such that the intermediate ring is located in the first latching groove and the second latching groove opposite to the first latching groove in an assembled state of the coupling, to thereby establish a releasable form-fit and non-positive connection in an axial direction between the bush and the ring.

15. The method of claim 14, wherein the rings and the bushes are connected essentially at a same time.

* * * * *